United States Patent [19]

Stanfield

[11] Patent Number: 4,598,492
[45] Date of Patent: Jul. 8, 1986

[54] FISH GAFF

[75] Inventor: Billy M. Stanfield, Orlando, Fla.

[73] Assignee: Thomas Gore, Orlando, Fla.

[21] Appl. No.: 781,270

[22] Filed: Sep. 30, 1985

[51] Int. Cl.⁴ ............................................. A01K 97/14
[52] U.S. Cl. .......................................... 43/5; 294/19.3; 294/26
[58] Field of Search ............... 43/5, 6; 294/26, 19.3, 294/82.2; 56/333; 81/60

[56] References Cited

U.S. PATENT DOCUMENTS

| | | | |
|---|---|---|---|
| 369,230 | 8/1887 | Chappell | 294/19.3 |
| 579,333 | 3/1897 | Smith | 294/19.3 |
| 853,930 | 5/1907 | Miller | 81/60 |
| 2,027,376 | 1/1936 | Grau | 294/82.2 |
| 2,196,460 | 4/1940 | Hertel | 294/82.2 |
| 2,924,482 | 2/1960 | Gibson | 294/19.3 |
| 3,833,252 | 9/1974 | Redding | 43/5 |
| 3,978,605 | 9/1976 | Maruniak | 43/5 |

FOREIGN PATENT DOCUMENTS 5317 of 1884 United Kingdom .................... 43/5

*Primary Examiner*—Gene P. Crosby
*Attorney, Agent, or Firm*—Macdonald J. Wiggins

[57] ABSTRACT

A gaff for game fish has a flared crook for engaging the body of a fish at the tail. An end portion of the crook is attached to a pole and includes a ratchet assembly. An L-shaped arm is pivotally attached to the ratchet assembly and is rotatable in one direction in the plane of the crook. A contact arm of the L-shaped arm closes the open end of the crook while a capture arm extends in the direction of the pole. When the contact arm contacts the body of the fish and the fish is pulled into the crook, the capture arm rotates to captivate the fish in the crook. The ratchet includes a release lever to release the fish without damage thereto.

12 Claims, 5 Drawing Figures

FISH GAFF

BACKGROUND OF THE INVENTION

1. Field of the Invention

The present invention relates generally to fish gaffs and more particularly to a self-actuating gaff.

2. Description of the Prior Art

In fishing for large fish such as marlin, tuna, sail fish and the like, it is necessary to use some form of apparatus to bring the fish aboard the vessel after it has been reeled in alongside. It is common to use various types of gaffs for this purpose. However, most of the gaffs in use may damage the fish and in many cases the fish can escape the gaff. A gaff hook is described in the U.S. Pat. No. 1,049,875 to Krueger which uses a claw-shaped head having a plurality of sharp barbs which can damage the fish and cause loss of blood and weight during the landing procedure. The Lange patent, U.S. Pat. No. 2,196,117, shows a spring-loaded gaff or grapple having a pair of sharp barbs and is undesirable because of the possibility of damage. A floating gaff is described by Maruniak in U.S. Pat. No. 3,978,605. This device also depends upon a pair of sharp points and serrations in the jaw to assist in holding the fish. An improved apparatus is taught by Jones in U.S. Pat. No. 4,000,576 but requires manual operation of the clamping action and the user must maintain tension to hold the fish in the jaws of the device.

These prior art gaffs are generally intended to grasp a fish around the gill area and can therefore damage the fish. There has been an increasing concern for conservation and many sports contests and the like require a game fish to be landed, weighed and released without injury to the fish. Conventional barbed gaffs thus cannot be used.

Thus, there is a need for a simple gaff which will operate automatically when applied to the fish and which will securely hold the fish without damage thereto.

SUMMARY OF THE INVENTION

The present invention is a gaff for holding game fish and the like while bringing the fish on board the fishing vessel by grasping the fish around the tail area. A pole has a crook element attached at its distal end having space within the crook to encircle the body of the type of fish to be landed at the tail. The opening in the crook has a tapered arrangement such that the fish may be easily guided into and caught in its opening. An L-shaped arm is disposed such that a contact arm closes the opening to the crook and the other closure arm is disposed parallel to the pole. At the point at which the two arms are joined, a pivot is provided which is attached to a ratcheting device. In accordance with the invention, when the crook is placed over a fish in a position to draw the fish into the crook, the contact arm is contacted by the fish body and will move in the direction permitted by the ratchet as the fish moves into the crook. This causes the closure arm normally parallel with the pole to rotate ninety degrees to the position formerly occupied by the contact arm. Thus, at this point, the fish is securely clamped in the hook by means of the closure arm. The ratchet prevents the arm from rotating in a direction to release the fish.

In accordance with the invention, it is preferred that the fish be grasped by the tail rather than the gill area. As may be recognized, the crook of the disclosed gaff may be placed at almost any point on the fish's body and is easily slid along to the tail area as the closure arm is activated. A line is attached to the end of the crook which is attached to the pole and is useful in assisting in landing large fish. Preferably, the pole can be released from the gaff after it is in position on the fish and the danger of breakage of the pole is eliminated.

After the fish is landed, a release button is operated which releases the ratchet and permits the closed crook to be opened. As the button is released, the L-shaped arm is moved to the original position and the gaff is in condition for the next use.

It is therefore a principal object of the invention to provide a simple automatic gaff for landing large game fish and the like.

It is another object of the invention to provide a fish gaff which will securely grip a fish without damage thereto.

It is yet another object of the invention to provide a fish gaff which need only be placed in contact with the fish to cause positive operation thereof.

It is yet another object of the invention to provide a fish gaff in which the closure thereof is caused by the fish moving into the gaff against a ratchet mechanism.

It is a further object of the invention to provide a fish gaff having a safety line attached thereto permitting release of the pole during landing.

These and other objects and advantages of the invention will become apparent from the following detailed description when read in conjunction with the drawings.

DETAILED DESCRIPTION OF THE PREFERRED EMBODIMENT

Figure 1:
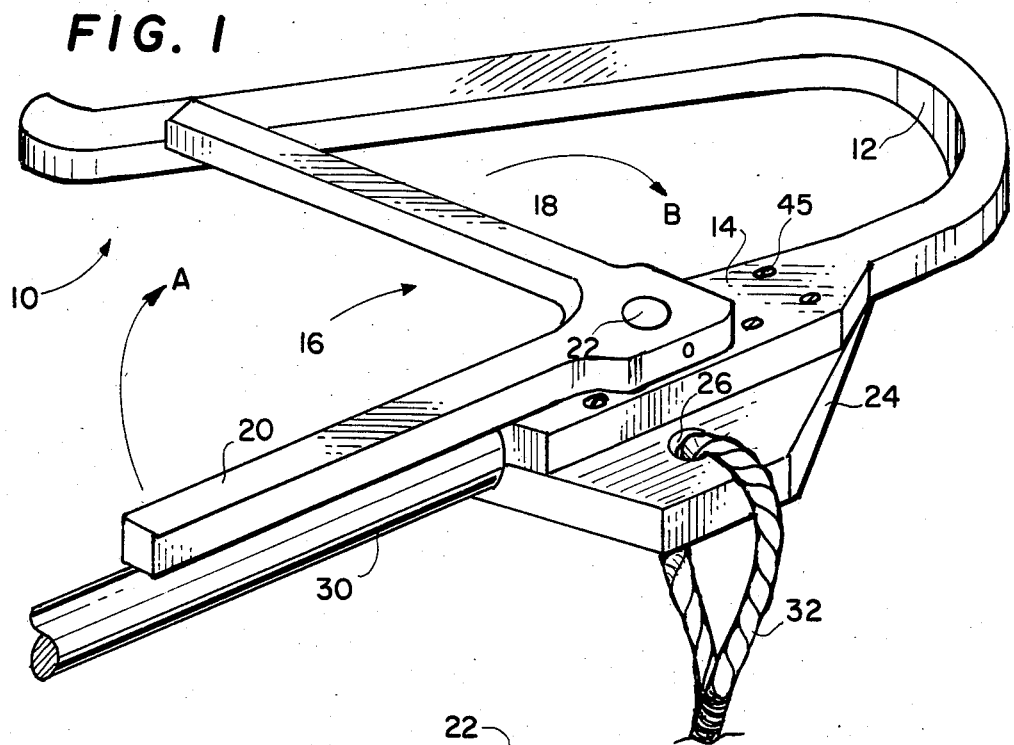
FIG. 1 is a perspective view of the crook portion of the fish gaff of the invention.

Referring first to FIG. 1, a perspective view of a gaff 10 in accordance with the invention is shown. A crook 12 is provided having a proximal end 14 to which a pole 30 is attached. Crook 12 as will be noted flares outward to a distal end 13 which is curved. Thus, a fish can be guided into crook 12 without danger of damage to the fish. A lower plate 24 is attached to the proximal end 14 of crook 12 by suitable fasteners such as screws 45. A pole 30 is inserted in an opening between proximal end 14 and bottom plate 24 and may be any desired length.

For use with small fish, pole 30 may be fixedly attached to plate 24 and crook end 14 and the fish landed using the pole. However, for large fish, there is a problem with a pole bending or breaking. Thus, a detachable pole arrangement is preferred as will be described herein below.

Bottom plate 24 extends laterally from proximal end 14 as shown and has an opening 26 therethrough to which a line 32 may be attached. Line 32 serves to pull a captivated fish on board the vessel after the pole is released. Disposed along the top surface of proximal end 13 of crook 12 is L-shaped arm 16. Arm 16 is pivoted at pivot pin 22 and has a first contact arm 18 which extends across the opening of crook 12 and a captivating or closure arm 20 which is at right angles to contact arm 18. FIG. 1 illustrates the gaff 10 in position for capturing a fish therein.

Figure 2:
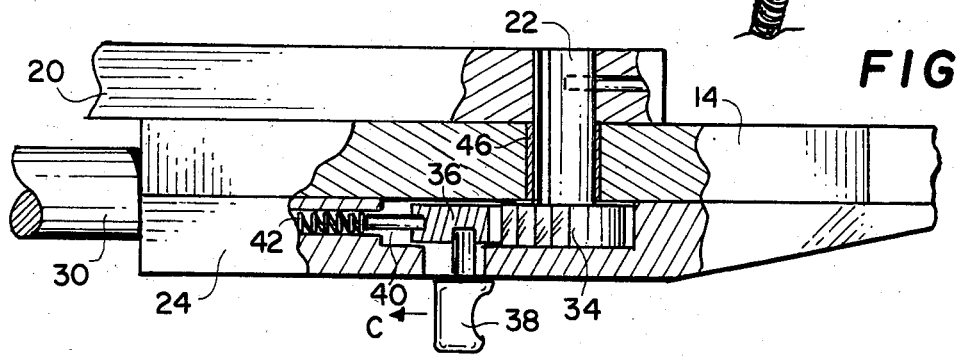
FIG. 2 is a cross-sectional view of a portion of the device of FIG. 1 illustrating details of the ratchet assembly.
Figure 3:
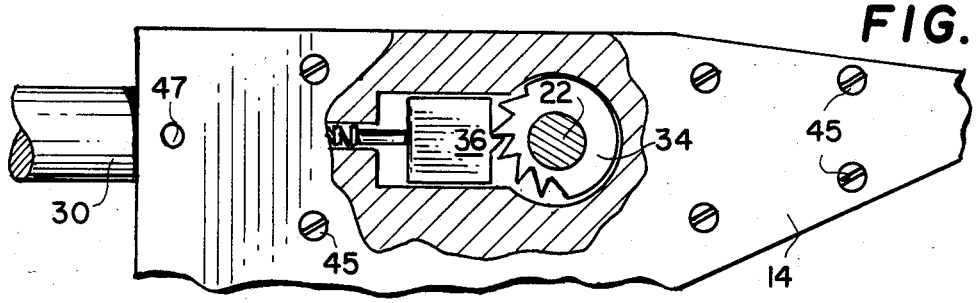
FIG. 3 is a cutaway view of a portion of the fish gaff of FIG. 1 showing additional details of the ratchet assembly.

Turning now to FIGS. 2 and 3, details of a ratchet assembly associated with arm 16 is shown. A partial cross-sectional view of the assembly is shown in FIG. 2. Bottom plate 24 is seen to contain a ratchet assembly having ratchet wheel 34 attached to pivot 22 which is free to turn in bushings 46. As seen in the cutaway view of bottom plate 24 of FIG. 3, ratchet wheel 34 includes ratchet teeth over about one-half of its diameter. Pivot 22 is pinned to arm 16 such that rotation of ratchet wheel 34 will occur when arm 16 rotates in the direction indicated by arrows A and B of FIG. 1. A ratchet pawl 36 is provided and is spring-loaded by pin 40 and spring 42. Pole 30 in FIG. 3 is permanently attached to plate 24 and crook end 14 by a pin 47 and is thus suitable for small fish.

When a fish is pulled alongside the vessel, pole 30 is used to position the crook 12 adjacent the tail area of the fish. The fish is then contacted by contact arm 18 and is pulled into crook 12 causing contact arm 18 to move as shown by arrow B in FIG. 1 and closure arm 20 to move as shown by arrow A until arm 18 is aligned with the proximal end 14 of crook 12. At this point, closure arm 20 serves to close crook 12 and securely hold the fish therein.

Pawl 36 includes a release lever 38 as seen in FIG. 2. When it is desired to release the fish after landing, lever 38 is moved in the direction indicated by arrow C releasing ratchet wheel 34 to permit rotation of arm 16 back to the position shown in FIG. 1. When release button 38 is released, reengaging pawl 36 with ratchet 34, the gaff is ready for another use.

Figure 4:
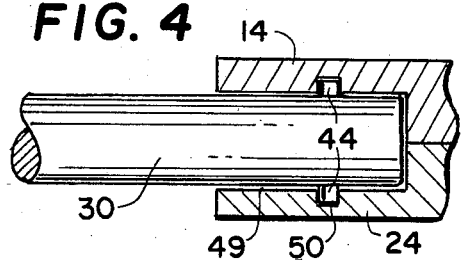
FIG. 4 is a cross-sectional side view of an alternative pole attachment which permits removal of the pole from the gaff.
Figure 5:
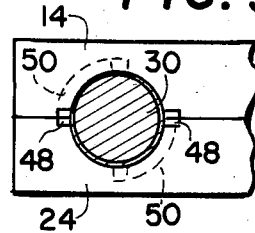
FIG. 5 is an end view of the attachment of FIG. 4.

An alternative arrangement for attachment of pole 30 to gaff 10 which is particularly applicable to landing large fish is shown in FIGS. 4 and 5. As will be understood, the size of crook 12 is selected in accordance with the body size of the fish to be handled. Lower plate 24 and crook end 14 have a cylindrical hole 49 formed therein of a diameter to provide a sliding fit with the end of pole 30. A pair of bayonet pins 44 are provided near the end of pole 30 and plate 24 and end 14 are provided with mating bayonet channels 45 and 48. After a fish is captivated in crook 12, pole 30 is rotated to the left and withdrawn from gaff 10. The fish is then landed with the aid of line 32.

Although a bayonet connection has been disclosed, other quick releases may be used such as shear pins, spring catches, line releases or the like that are known in the art.

The fish gaff of the invention may be made from any suitable material such as aluminum, stainless steel and the like, depending upon the strength required and the size of fish with which it will be used. Advantageously, a lightweight pole 30 may be used since the risk of damage or breakage is greatly reduced by use of line 32 and removal of pole 30 after engaging of crook 12.

As will now be recognized, the invention provides a simple, easy to use fish gaff which is operated in a natural fashion by guiding the fish into the crook of the device with the pole in a natural action upon which the pressure on the fish causes closure of the device to firmly captivate the fish until landed by means of the line. Release is equally easy to accomplish. The fish gaff utilizes no barbs or sharp portions which could damage the fish during landing.

While the preferred embodiment of the invention has been disclosed and described for exemplary purposes, it will be obvious to make various modifications thereto. For example, the crook and captivating arms may be formed from round stock and may be made in a variety of sizes. Such modifications are considered to fall within the spirit and scope of the invention.

I claim:

1. A gaff for landing game fish and the like comprising:
    a crook formed to engage the body of a fish;
    an end portion attached to said crook;
    an L-shaped element having a contact arm and a capture arm, said L-shaped element having a pivot pin attached to said end portion such that said L-shaped element is rotatable in the plane of said crook; and
    ratchet means attached to said end portion and said L-shaped element for permitting said L-shaped element to rotate in one direction such that said crook is first closed by said contact arm and thereafter closed by said capture arm.

2. The gaff as defined in claim 1 which further comprises:
    an elongate pole attached to said end portion; and
    a line attached to said end portion.

3. The gaff as defined in claim 2 which includes means for detaching said pole from said end portion after captivating a fish in said crook.

4. The gaff as defined in claim 3 in which said detaching means is a bayonet connection between said pole and said end portion.

5. The gaff as defined in claim 1 which further includes a release lever for releasing said ratchet means.

6. A gaff for captivating large fish for landing the same comprising:
    a crook having a flared opening for engaging the body of a fish;
    an end portion attached to a leg of said crook;
    an L-shaped arm pivotally attached to said end portion and having a contact arm and a capture arm, said contact arm disposed across said opening of said crook and said capture arm disposed in a direction away from said opening when said gaff is to be used; and
    a ratchet assembly disposed in said end portion and pivotally attached to said L-shaped arm to permit said L-shaped arm to rotate in a direction to close said opening by said capture arm when force is applied to said contact arm by contact thereof with the body of a fish.

7. The gaff as defined in claim 6 which further includes means in said end portion for attaching an elongate pole thereto.

8. The gaff as defined in claim 7 which further includes means in said end portion for attaching a line thereto.

9. The gaff as defined in claim 7 in which said pole attaching means includes means for releasing an attached pole after captivating a fish.

10. The gaff as defined in claim 6 in which said ratchet assembly includes a release lever for releasing said ratchet to remove a captivated fish from said gaff.

11. The gaff as defined in claim 6 in which said gaff is formed of aluminum.

12. The gaff as defined in claim 6 in which said gaff is formed of stainless steel.

* * * * *